W. H. MINER.
FRICTION GEAR.
APPLICATION FILED MAR. 21, 1917.
1,307,303.
Patented June 17, 1919.
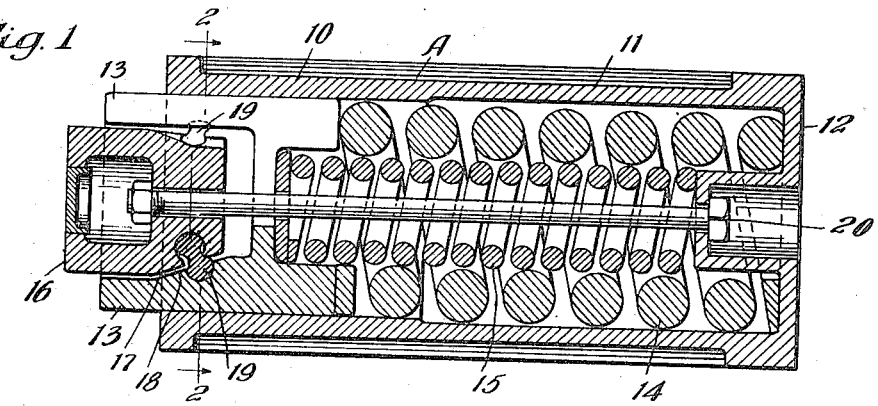
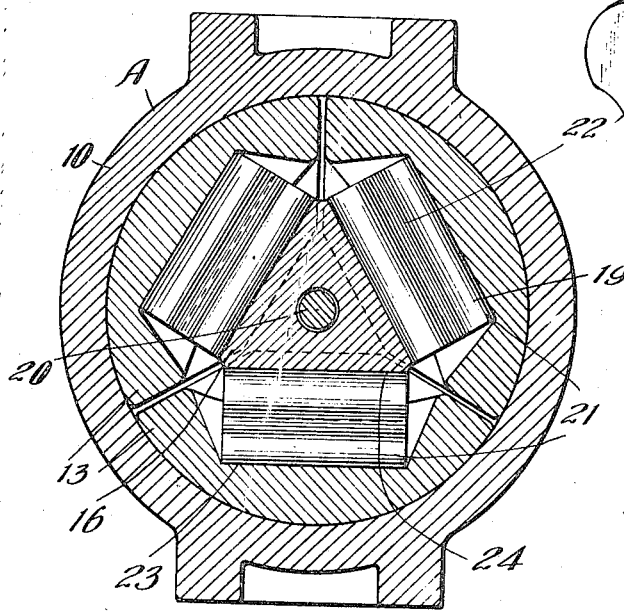
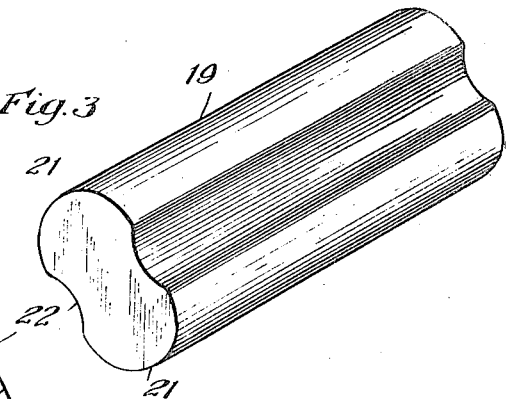
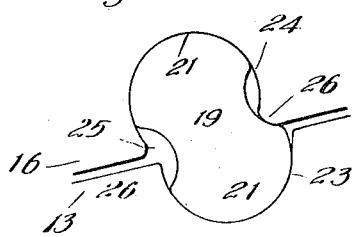
WITNESSES:
Wm. Geiger
INVENTOR.
William H. Miner
BY Geo. I. Haight
ATTORNEY

UNITED STATES PATENT OFFICE.

WILLIAM H. MINER, OF CHAZY, NEW YORK.

FRICTION-GEAR.

1,307,303.

Specification of Letters Patent.

Patented June 17, 1919.

Application filed March 21, 1917. Serial No. 156,476.

*To all whom it may concern:*

Be it known that I, WILLIAM H. MINER, a citizen of the United States, residing at Chazy, in the county of Clinton and State of New York, have invented a certain new and useful Improvement in Friction-Gears, of which the following is a full, clear, concise, and exact description, reference being had to the accompanying drawings, forming a part of this specification.

This invention relates to improvements in friction gears.

One object of the invention is to provide a friction gear of high capacity and wherein is a novel releasing means between the pressure-transmitting member and the friction shoes for insuring certain release.

Another and more specific object of the invention is to provide a novel type of releasing means so assembled with the pressure-transmitting member as to positively insure movement and actuation of said means when the pressure-transmitting member is moved either in compressing the gear or in release.

In the drawing forming a part of this specification, Figure 1 is a central longitudinal section of a friction gear showing my improvements in connection therewith. Fig. 2 is an enlarged sectional view taken substantially on the line 2—2 of Fig. 1. Fig. 3 is a perspective view of one of the releasing elements. And Fig. 4 is a diagrammatic view illustrating more particularly the method of seating the releasing elements in the pressure-transmitting member and friction shoes.

In said drawing, A designates a cylindrical casting having a friction shell proper 10 at its forward end, a spring casing 11 and an integral rear follower 12. Mounted within the casting A are friction shoes 13, circularly arranged, and a main spring comprising an outer heavy coil 14 and an inner lighter coil 15, said coils bearing against the friction shoes in the manner illustrated in the drawing. Coöperable with the friction shoes, is a pressure-transmitting member 16, the same having as many faces 17 as there are friction shoes, it being understood that each friction shoe is also provided on its interior with a corresponding face 18. Mounted between the pressure-transmitting member 16 and each of the friction shoes are my improved releasing elements 19, hereinafter more specifically described. The spring is held under initial compression and all the parts in assembled relation by means of a retaining bolt 20.

Each releasing element 19 is in the form of an elongated cam having opposite cylindrical or rounded edges 21—21 with the central portion of restricted cross section as indicated at 22, a true cross section of one of the releasing elements being shown in Fig. 1 and Fig. 4. In each of the friction shoes is provided a semi-circular recess 23 to receive the corresponding rounded edge of the adjacent element 19, each recess 23 being of such form that the friction shoe can be applied to the releasing element by movement in a plane perpendicular to the axis of the releasing element. In each face 17 of the pressure-transmitting member 16 is provided a corresponding recess 24 to receive the adjacent rounded edge of the releasing element, each recess 24 having a restricted throat as indicated at 25, thus providing two shoulders 26—26 which are adapted to engage the opposite sides of the releasing element at the restricted portion thereof upon extreme relative movements of the pressure-transmitting member and releasing elements. The restricted throat of each recess 24 is of less width than the maximum width of the rounded edge of the releasing element so that the latter are assembled with the pressure-transmitting member 16 by slipping the releasing elements longitudinally or lengthwise of the recesses 24. When thus assembled, it is apparent that the releasing elements 19 are locked with the pressure-transmitting member while at the same time the releasing elements are permitted a swinging or rocking movement with respect thereto.

In assembling the mechanism, it is apparent that all the releasing elements will first be attached to the pressure-transmitting member and the friction shoes then applied to the outer faces of the releasing elements and finally, the shoes, pressure-transmitting member and releasing elements then inserted as a unit within the casting A after the spring has been placed therein.

The normal relation of the pressure-transmitting member, friction shoes and releasing elements is best illustrated in Fig. 4 wherein it will be noted that the longest dimension of a section of the releasing element is inclined inwardly and forwardly and with the inner shoulder 26 of the pressure-transmitting member in proximity to the nearest side of the releasing element. Upon inward movement of the pressure-transmitting member relatively to the casting A, it is apparent that the pressure-transmitting member will positively oscillate each element 19 which has a bearing in the friction shoe, the amount of oscillation depending upon the permissible relative movement between the pressure-transmitting member and the friction shoe. Upon release of the pressure on the member 16, the outward movement of said member will positively oscillate the releasing elements back to their normal position, which operation is insured by the shoulders provided on the pressure-transmitting member for engaging the releasing elements. The elements 19, in combination with the pressure-transmitting member 16 will, as evident, act in the manner of a toggle to exert a spreading action on the friction shoes, thus increasing the friction between the shoes and the shell as the parts are forced inwardly. By this arrangement, the necessary frictional capacity is obtained while at the same time a certain release is effected due to the turning action of the releasing elements on the friction shoes and pressure-transmitting member.

I claim:

In a friction shock absorbing mechanism, the combination with a friction shell having an interior friction surface, of a plurality of friction shoes mounted within said shell and having outer friction surfaces coöperable with the friction surface of the shell, spring means for resisting relative movement between the shoes and shell, a pressure-transmitting member extended within the shoes, and a plurality of elements interposed between said member and the shoes, there being one element for each shoe, each of said elements having a pair of curved edges extending lengthwise of the elements, each element having a restricted section intermediate said curved edges, each shoe having a curved recess to accommodate one curved edge of one of said elements, said pressure-transmitting member being provided also with a series of recesses with curved bearing faces to accommodate the curved edges of said elements, each of the recesses in said member having a restricted throat providing shoulders adapted to coöperate with the restricted sections of said elements to limit the relative movement between said member and elements, each of said elements being insertible within its corresponding recess of the pressure member by movement lengthwise of the recess therein.

In witness that I claim the foregoing I have hereunto subscribed my name this 19th day of Mar., 1917.

WILLIAM H. MINER.